United States Patent
Jung et al.

(10) Patent No.: US 12,286,333 B2
(45) Date of Patent: Apr. 29, 2025

(54) LEVELLING RAMP ASSEMBLY

(71) Applicant: IP RESERVE PTY LTD, Margate Beach (AU)

(72) Inventors: Mayer Jung, Milton (AU); Christoper Roberts, St Lucia (AU)

(73) Assignee: IP RESERVE PTY LTD, Margate Beach (AU)

( * ) Notice: Subject to any disclaimer, the term of this patent is extended or adjusted under 35 U.S.C. 154(b) by 267 days.

(21) Appl. No.: 17/922,156

(22) PCT Filed: Mar. 22, 2022

(86) PCT No.: PCT/AU2022/050256
§ 371 (c)(1),
(2) Date: Oct. 28, 2022

(87) PCT Pub. No.: WO2022/198266
PCT Pub. Date: Sep. 29, 2022

(65) Prior Publication Data
US 2023/0183048 A1    Jun. 15, 2023

(30) Foreign Application Priority Data

Mar. 22, 2021  (AU) ................................ 2021900827
Aug. 23, 2021  (AU) ................................ 2021221433

(51) Int. Cl.
B66F 7/24        (2006.01)
(52) U.S. Cl.
CPC ..................... B66F 7/243 (2013.01)
(58) Field of Classification Search
CPC ................... B66F 7/243; B66F 7/00
See application file for complete search history.

(56) References Cited

U.S. PATENT DOCUMENTS 3,630,487 A * 12/1971 Wechter, Jr. ............ B66F 7/243
                                                   248/352
3,661,229 A *  5/1972 Stonhaus .................. B60T 3/00
                                                    188/32

(Continued)

FOREIGN PATENT DOCUMENTS

DE         10010372 A1    9/2001
DE         20220026 U1    2/2004

(Continued)

OTHER PUBLICATIONS

Chock Level—Fiamma [Viewed on internet on Mar. 9, 2022] <URL: https://www.youtube.com/watch?v=NWNbA5TvmyA>, Published on Dec. 13, 2012; Whole You Tube Video, particularly 0.13-0.38 seconds.

(Continued)

*Primary Examiner* — Lee D Wilson
(74) *Attorney, Agent, or Firm* — Dilworth & Barrese, LLP.; Michael J. Musella, Esq.

(57) ABSTRACT

A levelling ramp assembly having a ramp for supporting a wheel; the ramp having one or more ramp attachment elements located on the ramp face. At least one chock is provided for engaging a wheel whilst on the ramp. The chock having a one or more chock attachment elements located on the chock face such that the ramp attachment elements and chock attachment elements engage to hold the ramp and the chock together.

12 Claims, 19 Drawing Sheets

(56) References Cited

U.S. PATENT DOCUMENTS

| | | | | |
|---|---|---|---|---|
| 4,108,421 | A * | 8/1978 | Extine | B66F 7/243 |
| | | | | 254/88 |
| 4,776,548 | A * | 10/1988 | Bezenek | F16M 7/00 |
| | | | | D34/28 |
| 6,517,051 | B1 | 2/2003 | Cavanaugh | |
| 6,752,381 | B2 * | 6/2004 | Colak | B60T 3/00 |
| | | | | 254/88 |
| 7,040,603 | B1 * | 5/2006 | Tai | B60P 3/36 |
| | | | | 254/88 |
| 7,104,524 | B1 * | 9/2006 | Hidding | B66F 7/243 |
| | | | | 254/88 |
| 7,316,043 | B2 * | 1/2008 | Henblad | B60P 3/077 |
| | | | | 254/88 |
| 9,868,622 | B1 | 1/2018 | Turner | |
| 11,021,350 | B2 * | 6/2021 | Belton | B66F 13/00 |
| 2005/0132511 | A1 * | 6/2005 | Berg | B66F 7/243 |
| | | | | 14/69.5 |
| 2013/0020541 | A1 * | 1/2013 | Dawes | B66F 7/243 |
| | | | | 254/45 |
| 2020/0140214 | A1 * | 5/2020 | Gunn | B66F 7/243 |
| 2023/0183048 | A1 * | 6/2023 | Jung | B66F 7/243 |
| | | | | 254/88 |

FOREIGN PATENT DOCUMENTS

| | | |
|---|---|---|
| DE | 202009002825 U1 | 5/2009 |
| DE | 202010008349 U1 | 10/2010 |
| EP | 2546101 A1 | 1/2013 |

OTHER PUBLICATIONS

Level System Magnum—Fiamma, [Viewed on internet on Mar. 9, 2022] <URL: https://www.youtube.com/watch?v=mVw7MlirtyY> Published on Dec. 13, 2012; Whole You Tube Video, particularly 0.53-1.08 seconds.

* cited by examiner

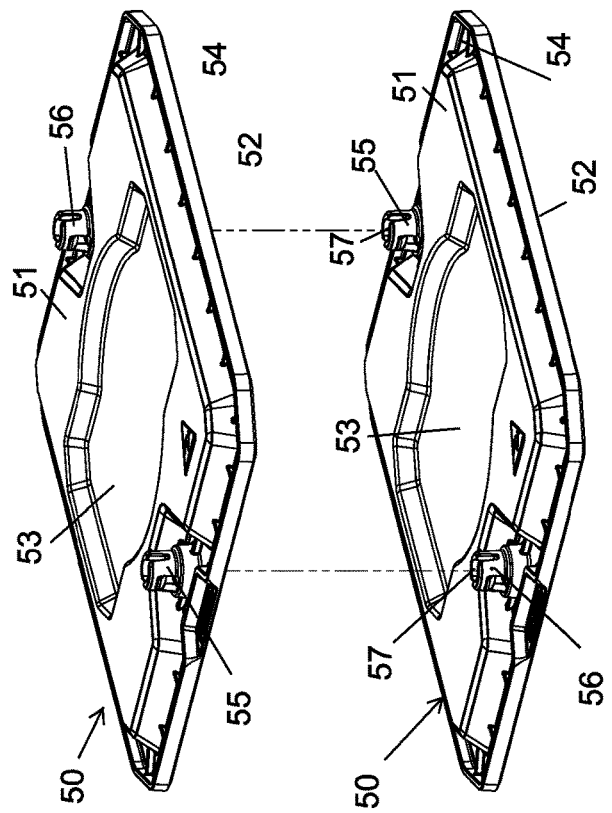
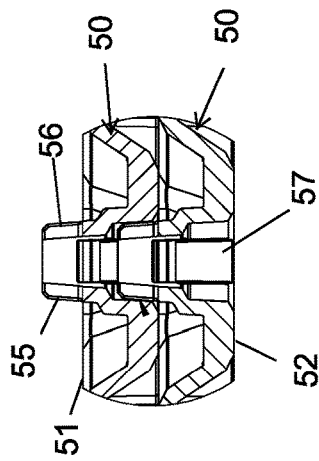
FIG. 19
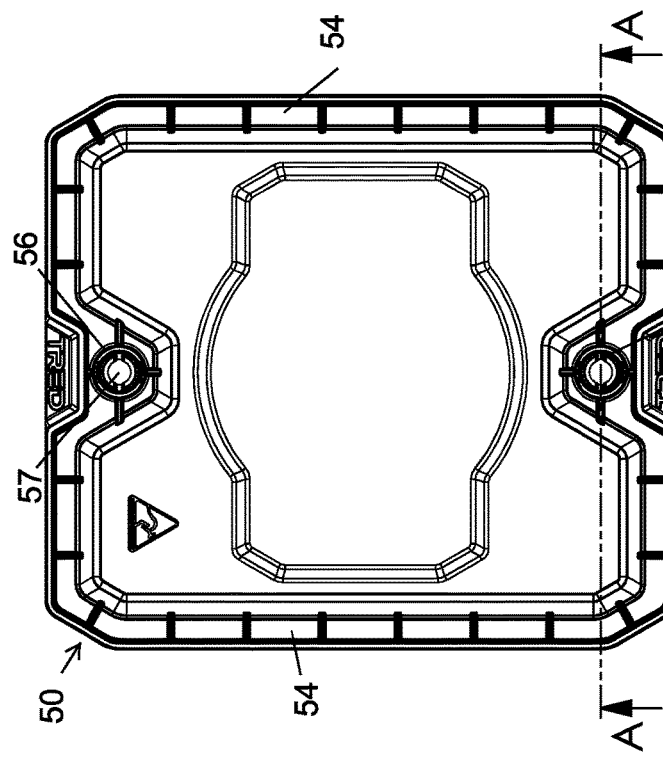
FIG. 17
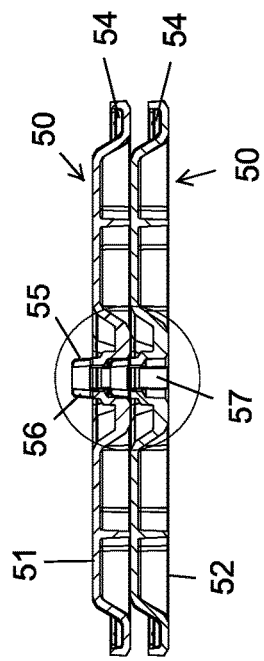
FIG. 18

LEVELLING RAMP ASSEMBLY

FIELD OF THE INVENTION

This invention relates to a levelling ramp assembly. In particular, this invention relates to a levelling ramp assembly used to level caravans on uneven ground surfaces and, therefore, will be described in this context. However, it should be appreciated that the levelling ramp assembly may be used for other applications such as levelling vehicles, trailers, camper trailers or motor homes.

BACKGROUND OF THE INVENTION

Caravans allow people to travel from location to location largely without the need to pack and unpack a multitude of items. One issue that most users of caravans face at one time or another is uneven ground. A caravan parked on uneven ground can make sleeping or eating a challenging experience. Accordingly, most users of caravans will attempt to level their caravan by driving one of the caravan's wheels onto an artificially raised platform.

In its simplest format, a raised platform is often a series of bricks. The caravan is driven up onto the bricks and chocks placed on one or both sides of the lifted caravan wheel. The difficulty is that bricks have a square edge, thus making the entry and exit on the brick somewhat difficult. Further, the bricks can move and have a non-variable height. If bricks are stacked, this exacerbates the entry and exit issue. Further, stacked bricks make the raised platform unstable and inherently dangerous.

The most common form of artificially raised platforms is plastic ramps. Plastic ramps, in their most common form, have a wheel engaging face with a consistent sloping gradient. In use, the ramp is placed adjacent to a caravan wheel on the lower side of the uneven ground. The caravan is then driven up the ramp until the axle of the caravan is level. A chock is then used to hold the wheel in position.

Many caravans in today's marketplace are large. Accordingly, most large caravans have a dual axle. To level a dual axle caravan, two ramps are needed, with one ramp being placed under each wheel. This can be an issue as the spacing between the front wheel and the rear wheel is relatively small. Therefore, the length of the ramp is restricted.

International Patent Application No. PCT/AU2012/001570 has provided a solution to this problem. The ramp disclosed in this patent application is divided into two interconnected parts that can be split apart and reconnected. In use, the first part of the ramp is of a length to fit between the front wheel and the rear wheel of a dual axle caravan. Once placed in that position, the caravan is driven onto the first part of the ramp. This opens a gap between the front wheel and the rear wheel. The second part of the ramp can then be connected to the first part. The caravan can then be driven higher on the ramp.

The problem with the ramp disclosed in International Patent Application No. PCT/AU2012/001570 is that it has three flat levels for the location of a caravan wheel. Unfortunately, the flat levels rarely enable the tyres to be positioned horizontally. Accordingly, the tyres often are partially on the incline portion of the ramp, which can be disconcerting to a user. Further, a chock is required to prevent unwanted movement of the wheel of a caravan even when a wheel is located on a flat level, with the tyre not fitting horizontally on the flat portion of the ramp the chock will not fit correctly as the design intended.

In almost every type of ramp that is used to level a caravan, a chock is required to brace a caravan wheel. Without the use of a chock to brace a caravan wheel on a ramp, the caravan is inherently unstable with unwanted movement possible. Hence chocks are an essential component for levelling a caravan when using a ramp. Unfortunately, a chock is relatively small when compared to a ramp and can be misplaced easily. Often the chock is specifically configured for use with a particular ramp. Hence, if you lose a chock, the ramp becomes unable to level a caravan.

OBJECT OF THE INVENTION

It is an object of the invention to overcome and/or alleviate the abovementioned problems and/or provide the consumer with a useful or commercial choice.

SUMMARY OF THE INVENTION

In one form, although not necessarily the only or broadest form, the invention resides in a levelling ramp assembly comprising:
  a ramp for supporting a wheel; the ramp having a ramp face with one or more ramp attachment elements located on the ramp face;
  at least one chock for engaging a wheel whilst on the ramp; the chock having a chock face with one or more chock attachment elements located on the chock face;
  wherein the ramp attachment elements and chock attachment elements engage to hold the ramp and the chock together.

Typically the levelling ramp assembly has only a single chock.

The ramp may have a number of ramp faces. Typically, the ramp has a top ramp face, a bottom ramp face, and an end ramp face. Two spaced-apart side ramp faces may connect the top ramp face, the bottom ramp face and the end ramp face.

The chock may have a number of chock faces. The chock may have a top chock face, a bottom chock face and an end chock face. Two spaced-apart side chock faces may connect the top chock face, the bottom chock face and the end chock face.

Preferably, the one or more ramp attachment elements may be located on the end ramp face. However, it is envisaged that the one or more ramp attachment elements may be located on another ramp face, such as the side ramp face or bottom ramp face.

Normally there is a plurality of ramp attachment elements. Preferably there are two or three or four or five ramp attachment elements.

Preferably, the one or more chock attachment elements may be located on the bottom chock face. However, it is envisaged that the one or more chock attachment elements may be located on another chock face, such as the side chock face or top chock face.

Normally there is a plurality of chock attachment elements. Preferably there are two or three or four or five chock attachment elements.

There may be an equal number of ramp attachment elements and chock attachment elements. The ramp attachment elements may be male attachment elements, whilst the chock attachment elements may be female attachment elements or visa versa. Preferably, the ramp attachment elements are male attachment elements, whilst the chock attachment elements are female attachment elements.

The ramp attachment elements and chock attachment elements may slidably engage to hold the ramp and the chock together. That is, the chock is slid with respect to the ramp to engage respective ramp attachment elements and chock attachment elements. Preferably, the chock is slid laterally (or sideways) with respect to the ramp to engage respective ramp attachment elements and chock attachment elements.

The ramp attachment elements and chock attachment elements may slidably disengage to remove the ramp from the chock together. That is, the chock is slid with respect to the ramp to disengage respective ramp attachment elements and chock attachment elements. Preferably, the chock is slid laterally with respect to the ramp to disengage respective ramp attachment elements and chock attachment elements.

The ramp attachment elements may be located at different heights on the ramp face. Similarly, the chock attachment elements may be located at different heights on the ramp face.

A grove may be located within one or more male attachment elements. A tab may be located within one or more female attachment elements. The tab and the groove may co-operate to hold the ramp attachment elements and chock attachment elements together.

The ramp may be made from a series of connected tubes. The tubes may extend upwardly from the bottom ramp face to the top ramp face. The tubes may be polygonal in transverse cross-section. Normally, the tubes are hexagonal in transverse cross-section.

The chock may be made from a series of connected tubes. The tubes may extend upwardly from the bottom chock face to the top chock face. The tubes may be polygonal in transverse cross-section. Normally, the tubes are hexagonal in transverse cross-section.

A multiplicity of ramp locking elements may be along a length of the top ramp face. A one or more chock locking elements may be along a length of the bottom chock face. The ramp locking elements and the chock locking elements may engage with each other to lock the chock to the ramp.

The ramp locking elements may be formed along a strip that extends adjacent a middle of the top ramp face. The ramp locking elements may also be formed within ends of the tubes of the top ramp face. The locking ramp elements may be in the form of teeth. The teeth may be in transverse alignment.

The chock locking elements may be formed on the bottom chock face. The locking chock elements may be in the form of a multiplicity of laterally extending teeth.

The ramp may include one or more ramp connecting elements. The ramp connecting elements may be used to connect two ramps together. Normally the ramp connecting elements are located on the top ramp face. Preferably the ramp connecting elements are located adjacent four corners of the top ramp face. The ramp connecting elements may be male elements, female elements, or a combination thereof.

The levelling ramp assembly may include one or more plates. The plates may be removably attached to the ramp. Normally two or three or four plates can be attached to the ramp. The plates are typically rectangular in shape and have a top plate face and a bottom plate face.

The ramp may include one or more ramp joining elements. The ramp joining elements may be used to join one or more plates to the ramp. Normally the ramp joining elements are located on the bottom ramp face. The ramp joining elements may be male elements, female elements or a combination thereof.

Each of the plates may include one or more plate joining elements. Normally the plate joining elements are located on the top plate face. The plate joining elements may be male elements, female elements, or a combination thereof.

Each plate may be connected to another plate using the plate joining elements. Preferably, each plate joining element is both a male and a female plate joining element.

The top plate face may include a sunken floor for supporting a caravan stabiliser leg. A recess may extend around the sunken floor to capture insects. Normally the recess is located around a perimeter of the plate.

In another form, the invention resides in a ramp for supporting a wheel, the ramp comprising:
  a ramp face with one or more ramp attachment elements located on the ramp face;
  wherein the ramp attachment elements are formed to engage with a chock, the chock having a chock face with one or more chock attachment elements located on the chock face,
  wherein the ramp attachment elements are able to engage with chock attachment elements to hold the ramp and the chock together.

In yet another form, the invention resides in a chock for supporting a wheel; the chock comprising:
  a chock face with one or more chock attachment elements located on the chock face;
  wherein the chock attachment elements are formed to engage with a ramp, the ramp having a ramp face with one or more ramp attachment elements located on the ramp face,
  wherein the chock attachment elements are able engaged with ramp attachment elements to hold the ramp and the chock together.

In still yet another form, the invention resides in a levelling ramp assembly comprising:
  a ramp for supporting a wheel; the ramp having a bottom ramp face with one or more ramp joining elements located on a bottom ramp face;
  at least one plate for increasing a height of the ramp; the plate having a top chock face with one or more chock attachment elements extending upwardly on the top chock face;
  wherein the ramp joining elements and plate joining elements engage to hold the ramp and the plate together.

In another form, the invention resides in a plate for joining to a ramp, the plate comprising:
  a top plate face and a bottom plate face;
  one or more plate joining elements extending upwardly from a top plate face;
  wherein the plate joining elements are formed to engage with a ramp, the ramp having a bottom ramp face with one or more ramp joining elements located on the ramp face,
  wherein the plate joining elements are able to engage with ramp joining elements to hold the ramp and the plate together.

Further features of the invention will become apparent from the detailed description below.

BRIEF DESCRIPTION OF THE DRAWINGS

An embodiment of the invention will be described, by way of example only, with reference to the accompanying figures in which.

FIG. 17 is a top view of two plates nested together according to a first embodiment of the invention;

FIG. 18 is a side sectional view of two plates nested together as shown in FIG. 17;

FIG. 19 is a detailed side sectional view of two plates nested together as shown in FIG. 18;

FIG. 20 is a perspective view of a two plates, one located above another, according to a first embodiment of the invention;

DETAILED DESCRIPTION OF THE PREFERRED EMBODIMENTS

Figure 1:
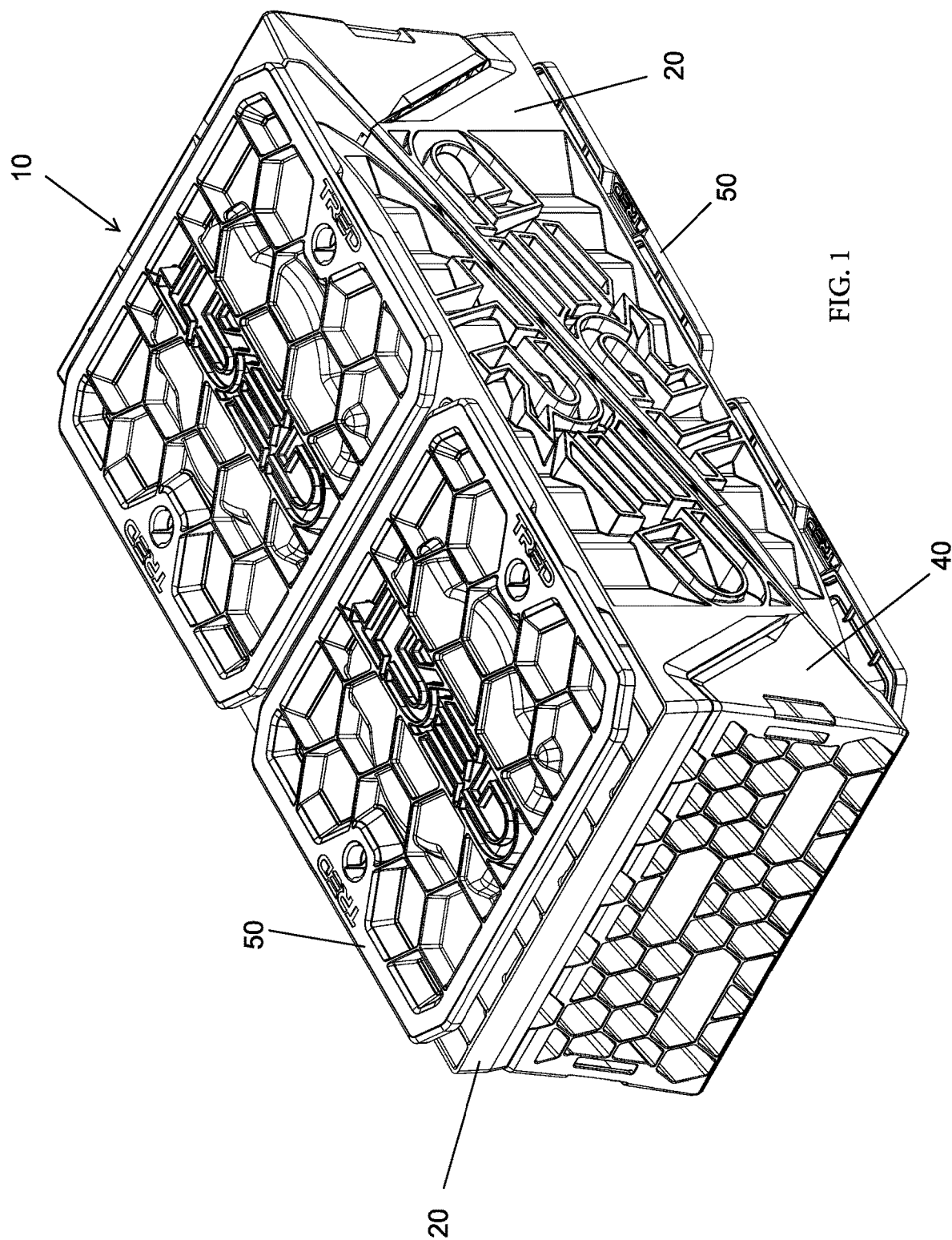
FIG. 1 is a perspective view of a levelling ramp assembly according to a first embodiment of the invention.
Figure 2:
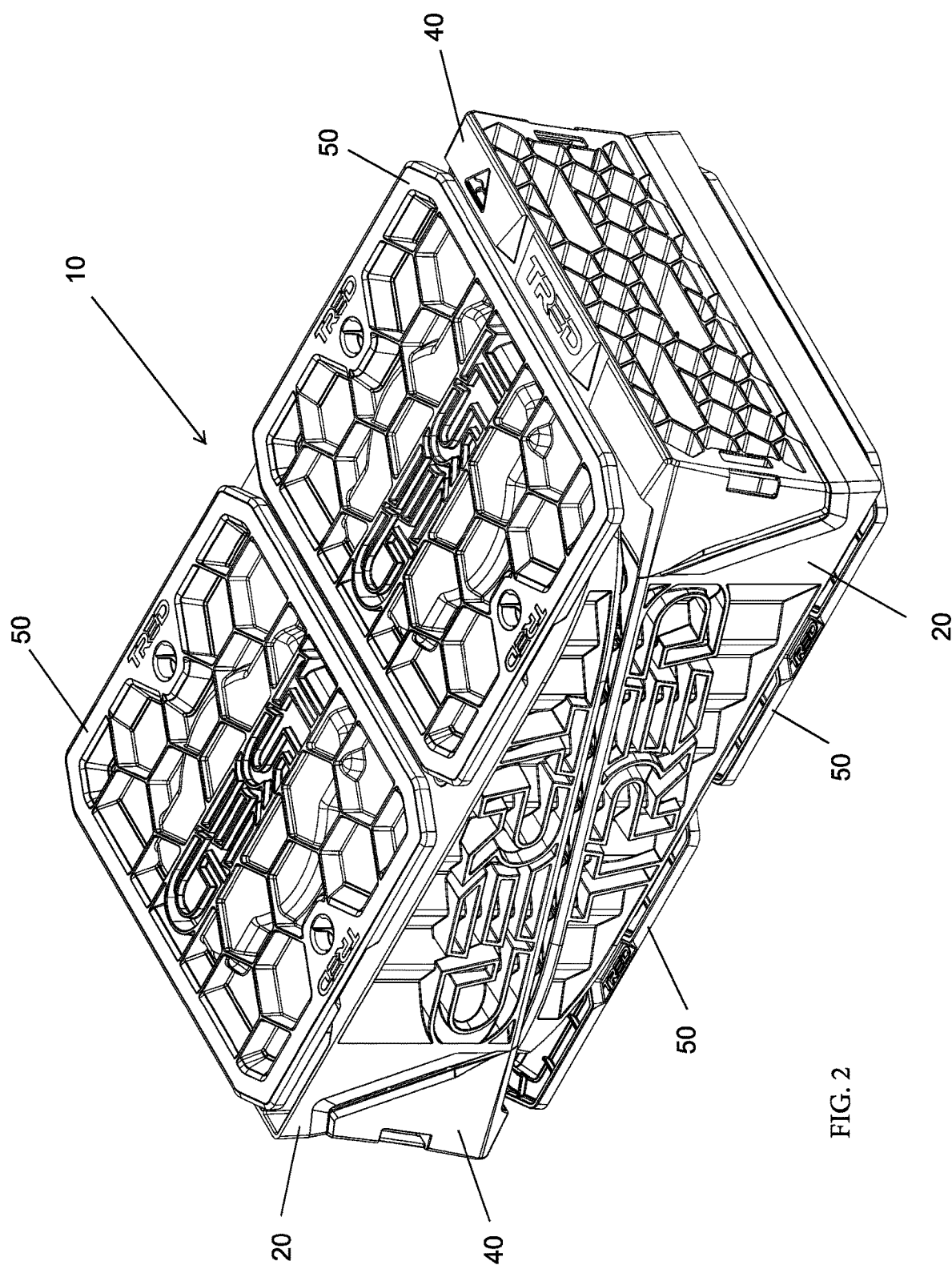
FIG. 2 is a further perspective view of the levelling ramp as shown in FIG. 1.
Figure 3:
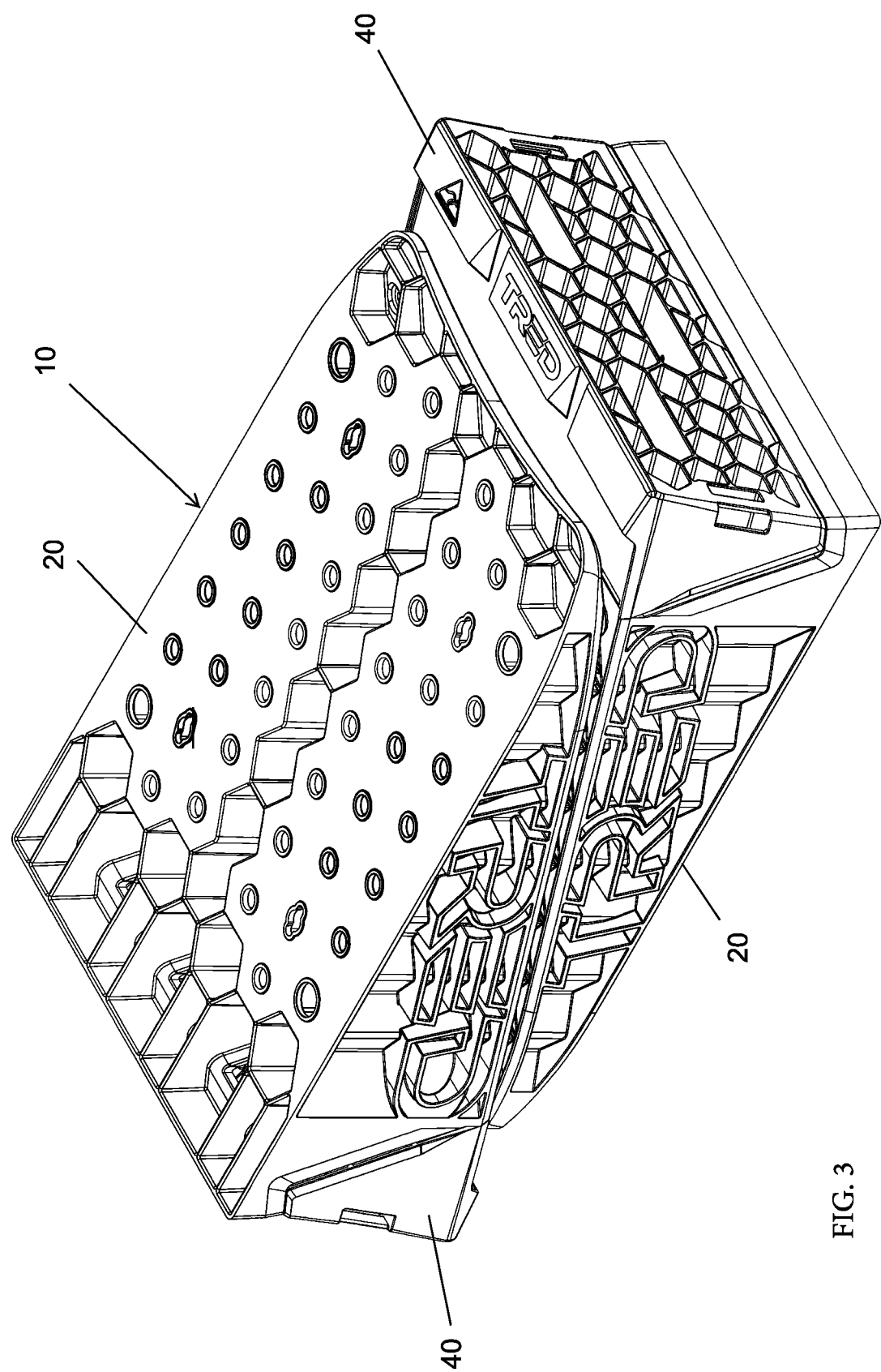
FIG. 3 is a perspective view of the levelling ramp assembly with no plates according to a first embodiment of the invention.
Figure 4:
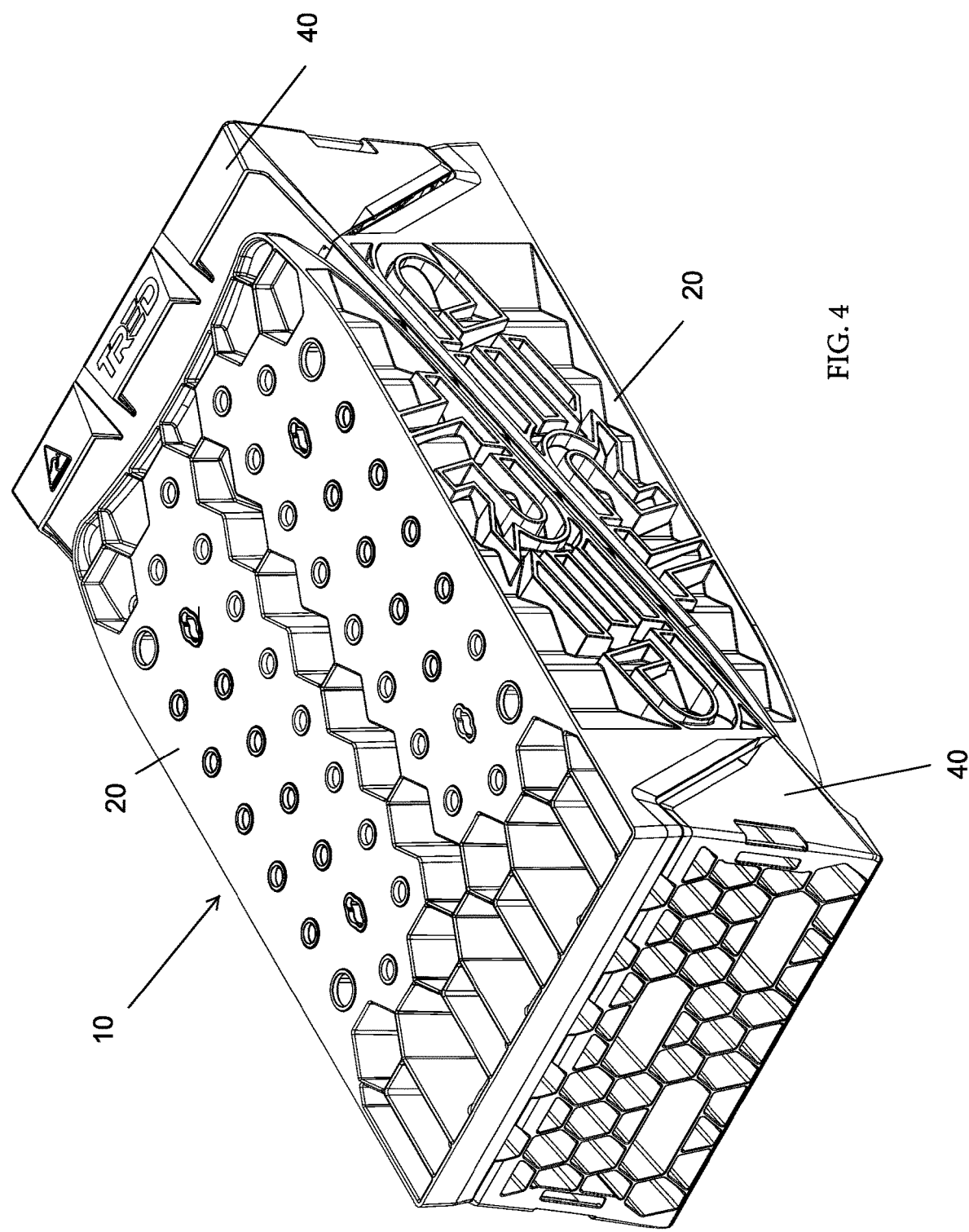
FIG. 4 is a further perspective view of the levelling ramp assembly as shown in FIG. 3.
Figure 5:
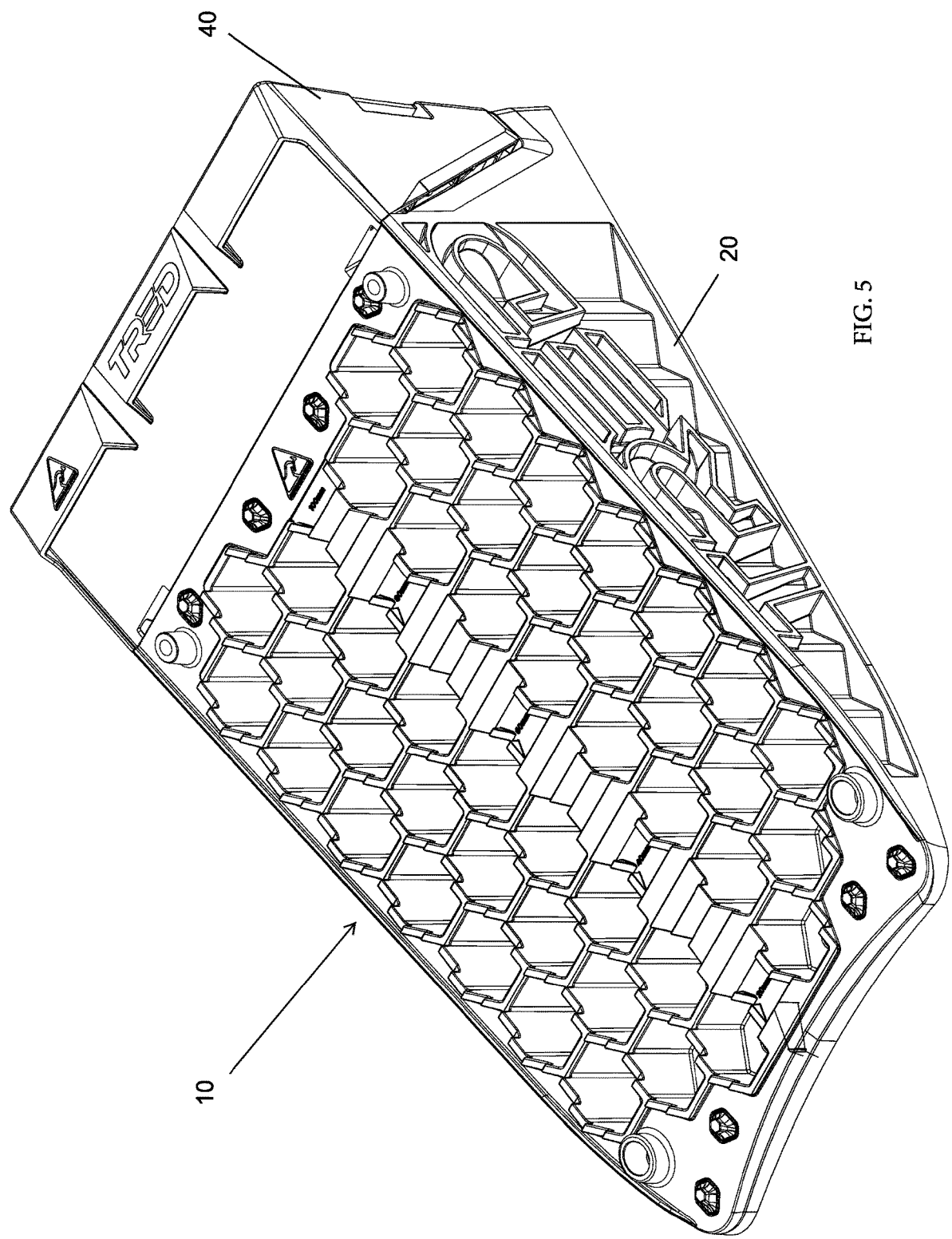
FIG. 5 is a perspective view of a chock attached to a ramp according to a first embodiment of the invention.
Figure 6:
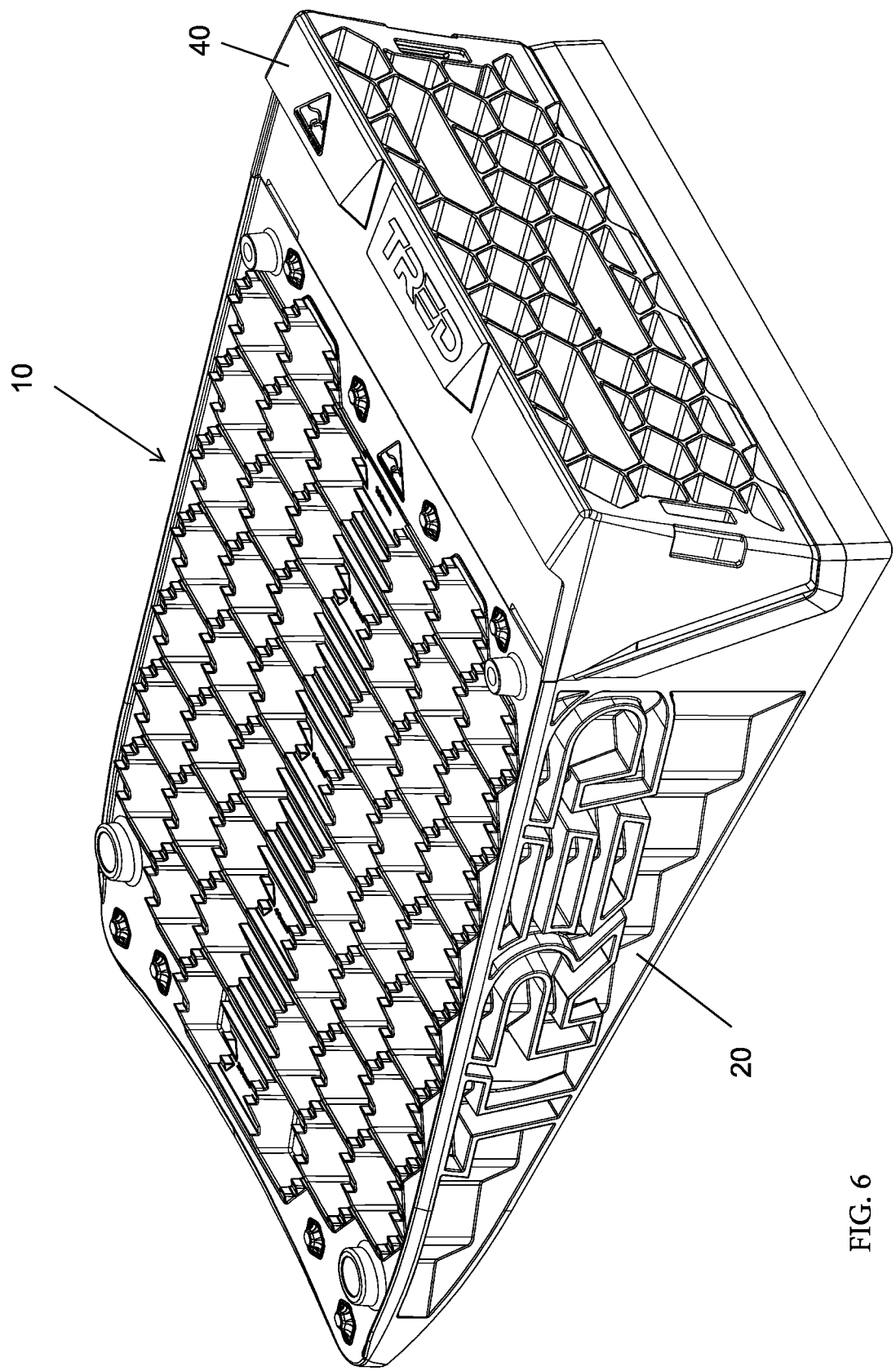
FIG. 6 is a further perspective view of a chock attached to a ramp as shown in FIG. 5.
Figure 7:
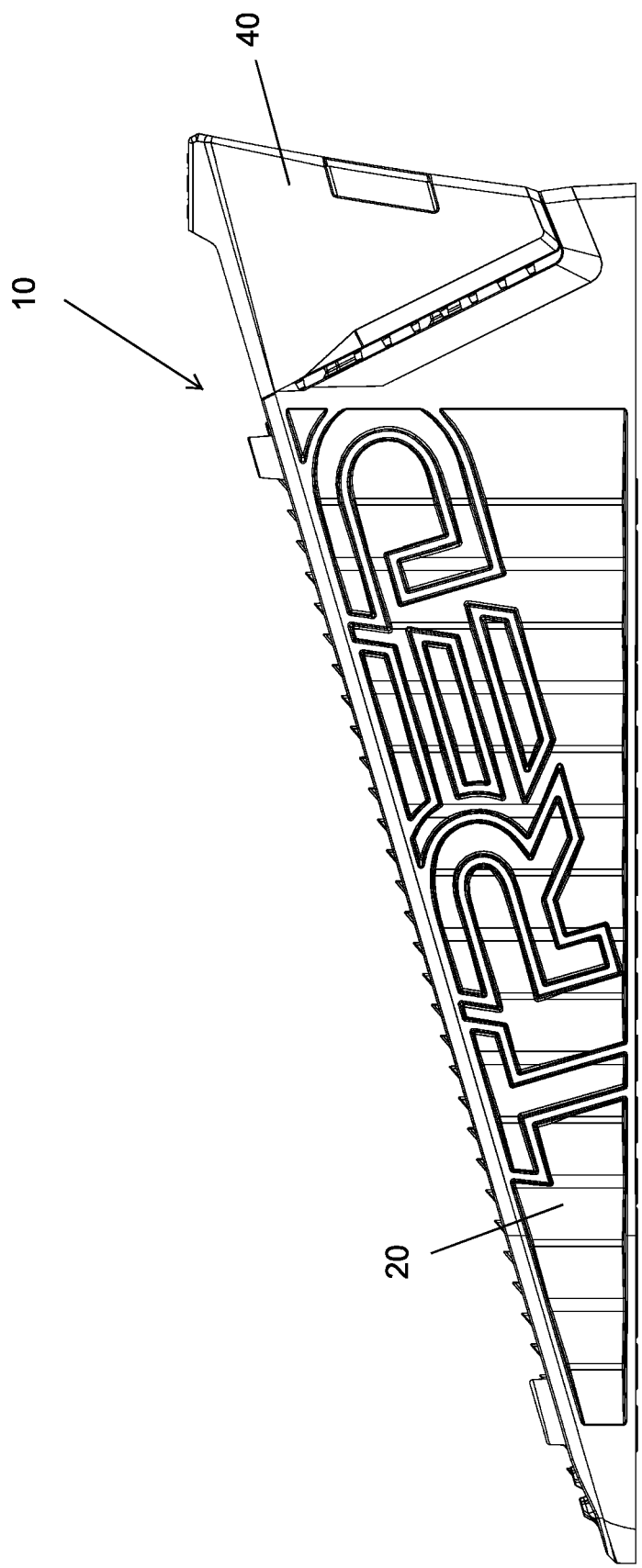
FIG. 7 is a side view of a chock attached to a ramp as shown in FIG. 5.
Figure 8:
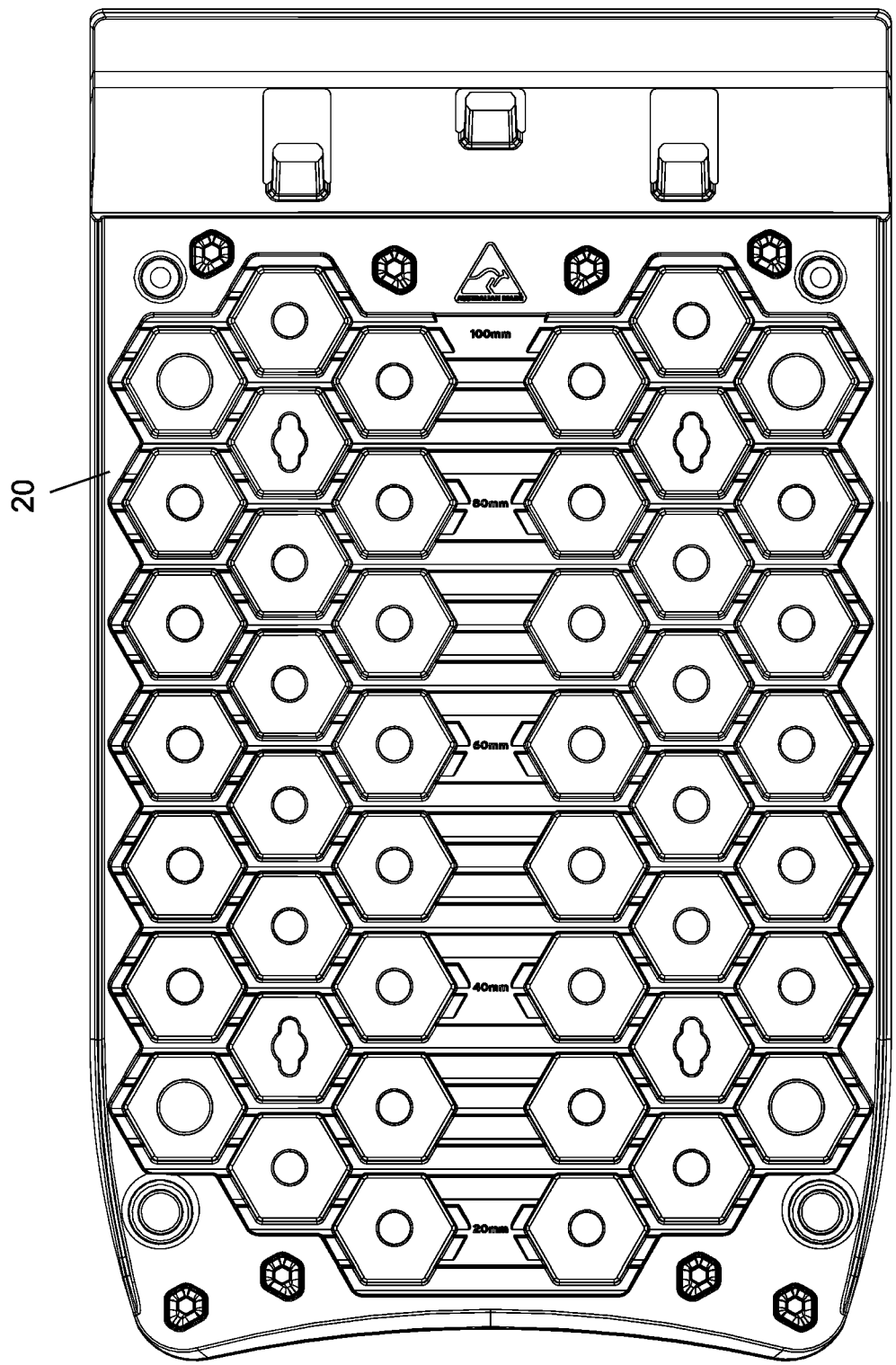
FIG. 8 is a top view of a chock attached to a ramp as shown in FIG. 5.
Figure 9:
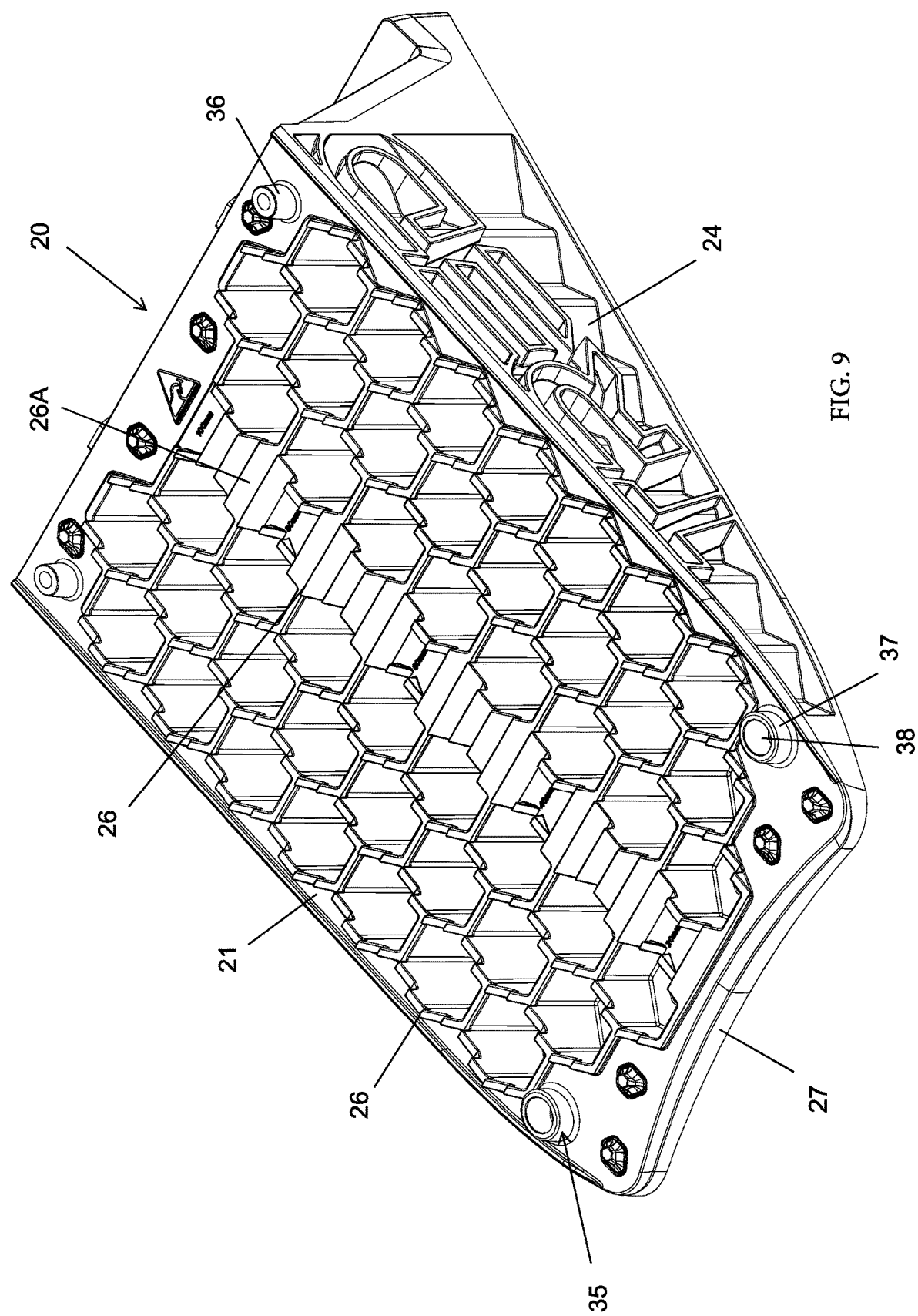
FIG. 9 is a perspective view of a ramp according to a first embodiment of the invention.
Figure 10:
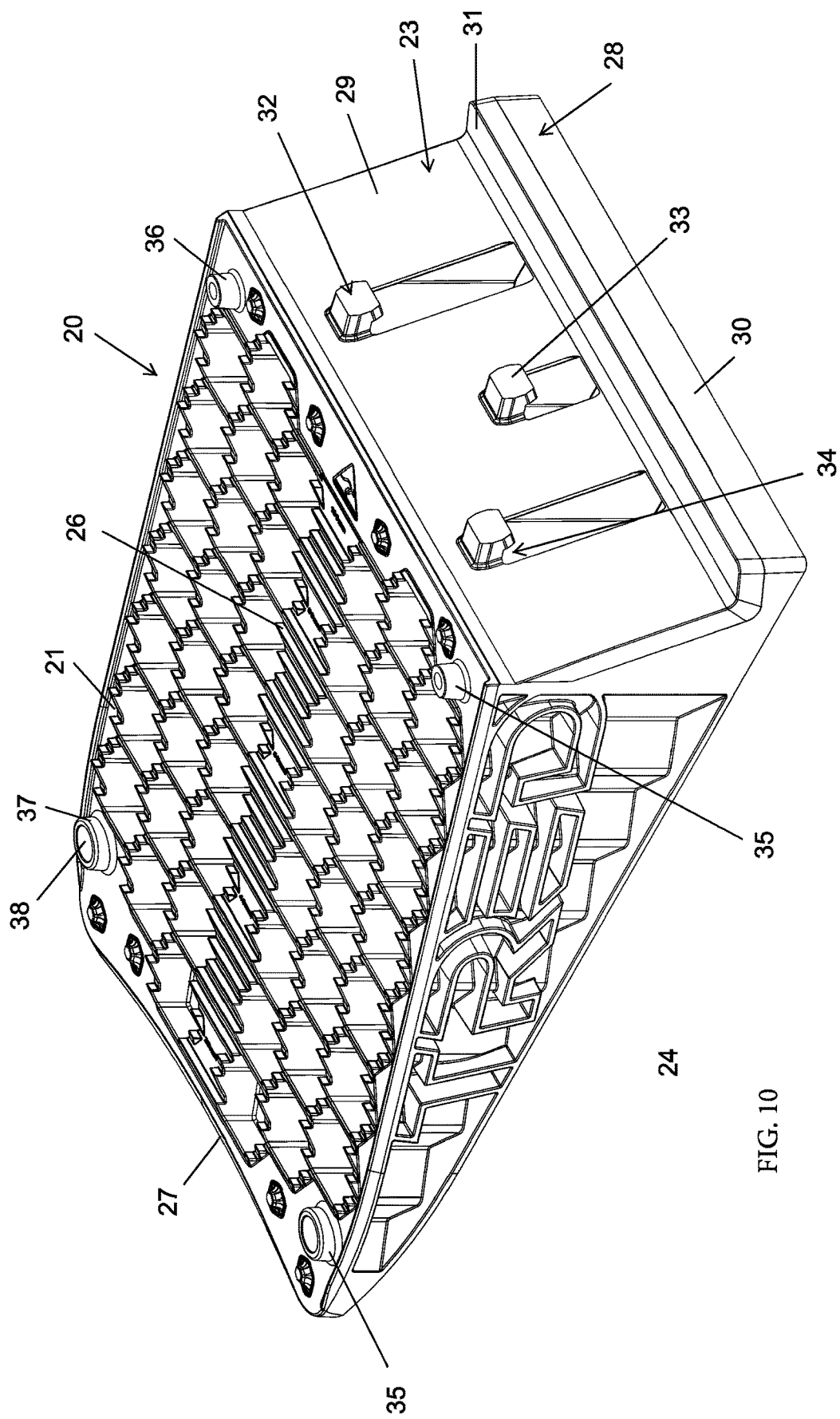
FIG. 10 is a further perspective view of a ramp as shown in FIG. 9.
Figure 11:
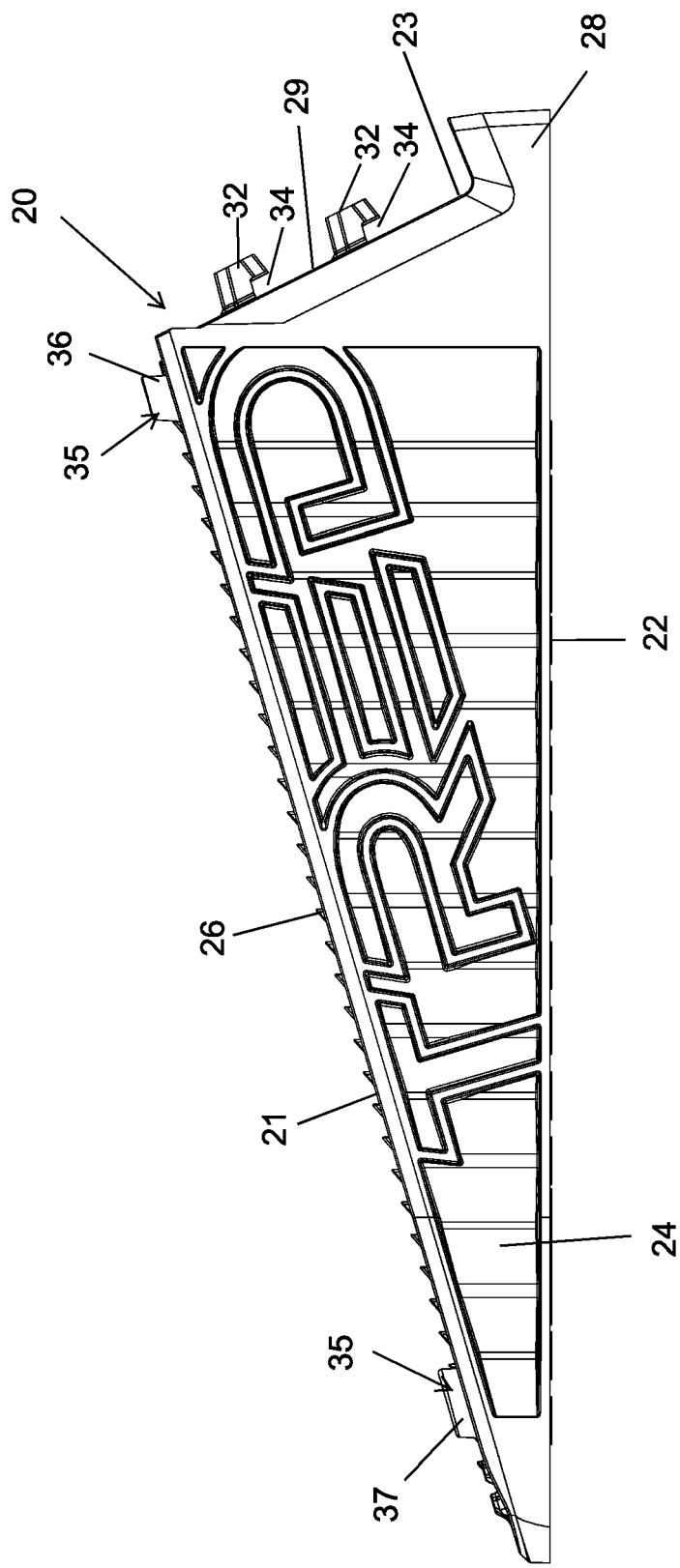
FIG. 11 is a side view of a ramp as shown in FIG. 9.
Figure 12:
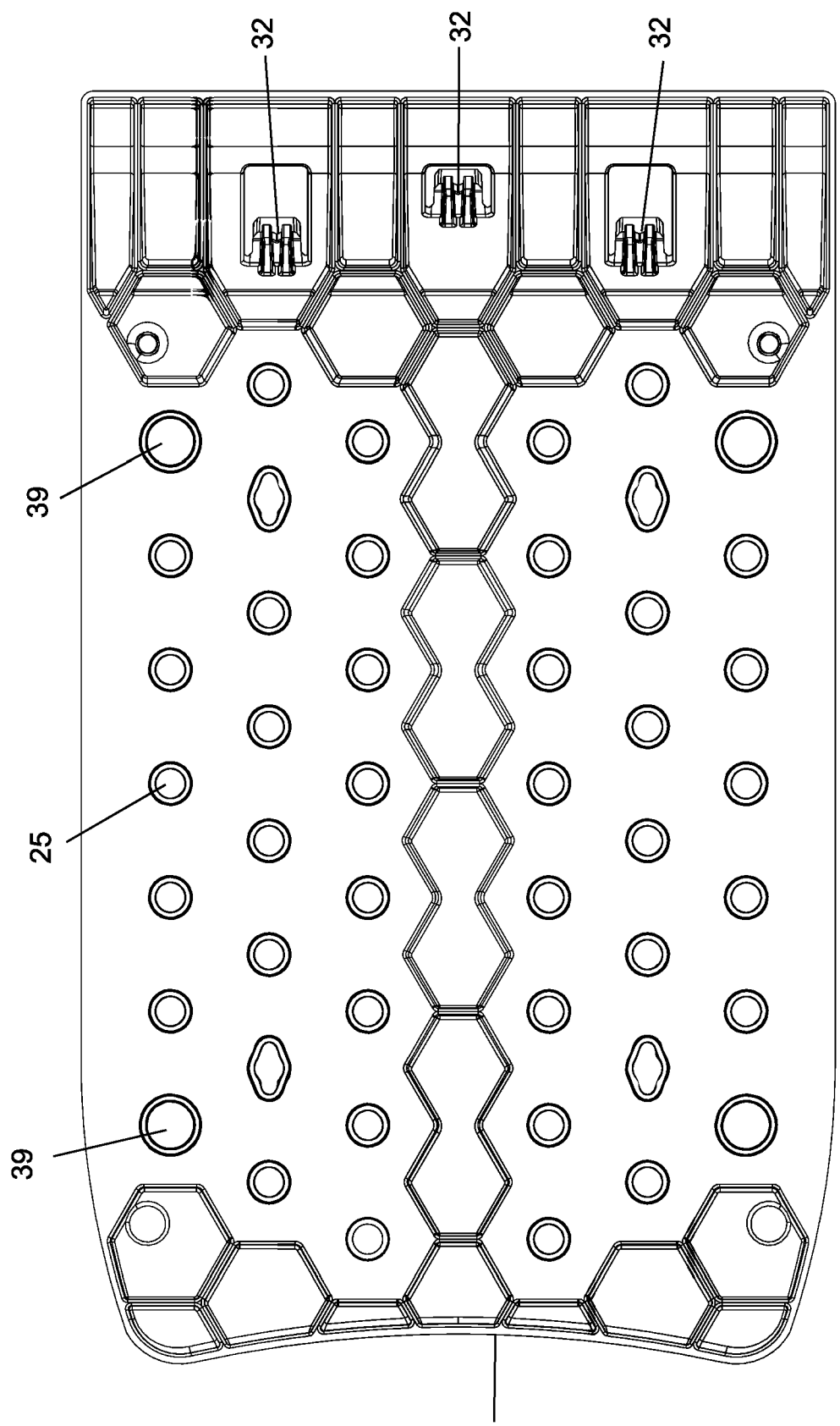
FIG. 12 is a bottom view of a ramp as shown in FIG. 9.
Figure 13:
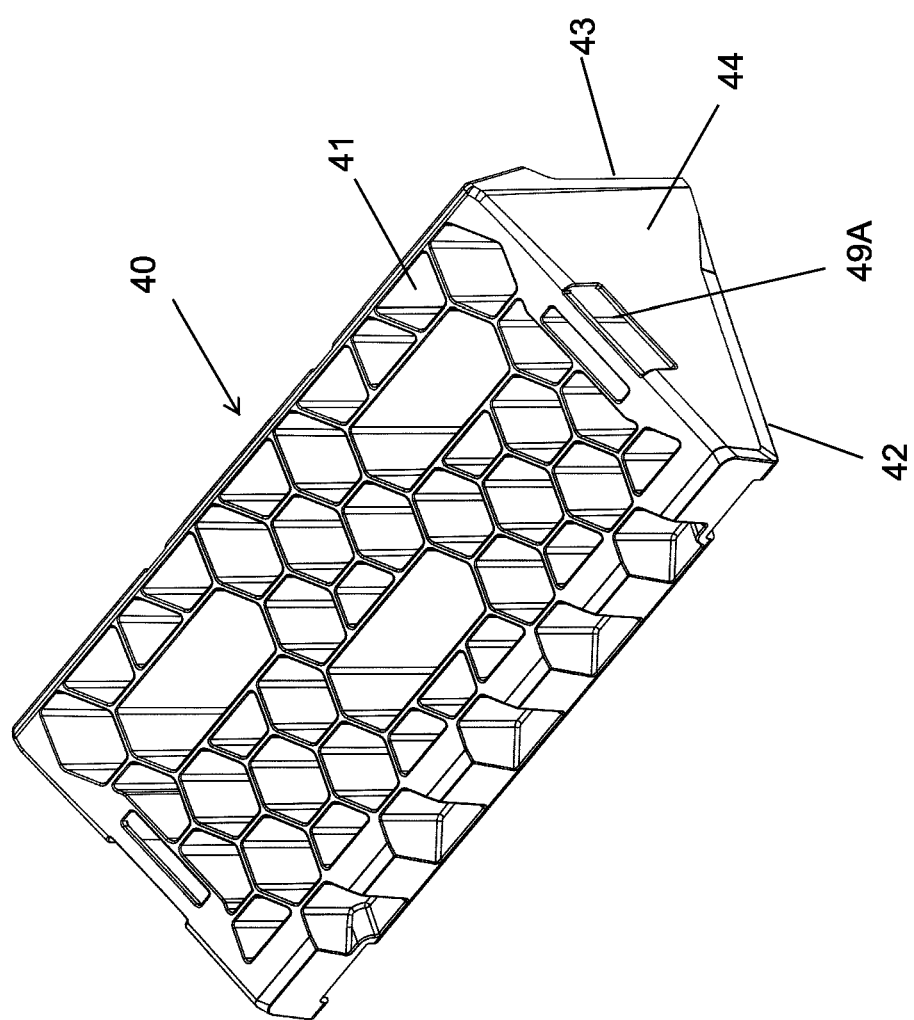
FIG. 13 is a perspective view of a chock according to a first embodiment of the invention.
Figure 14:
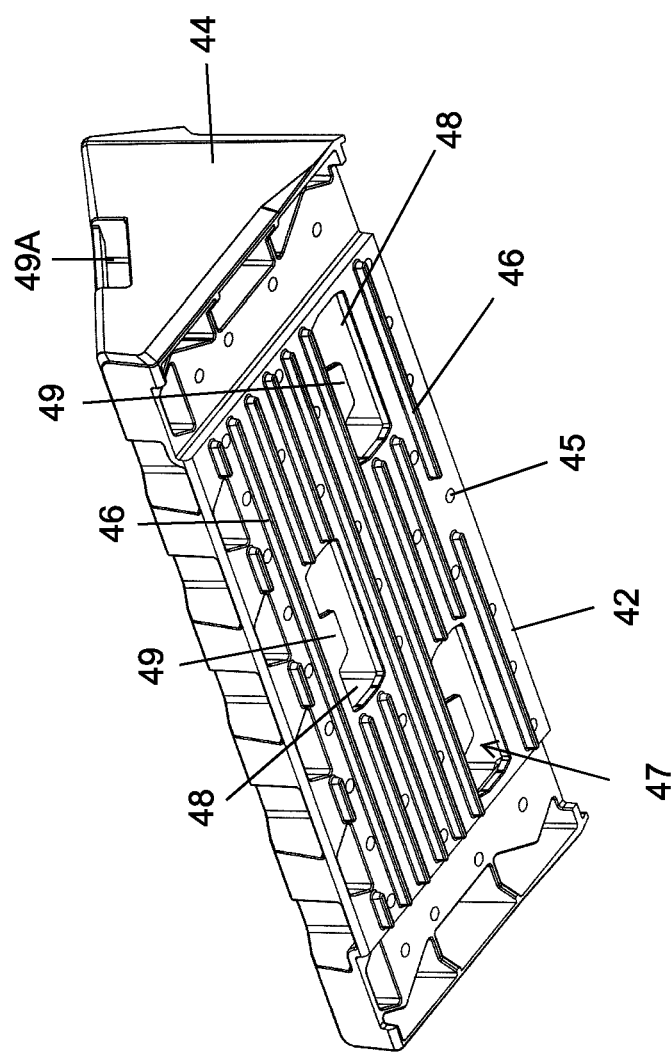
FIG. 14 is a further perspective view of a chock as shown in FIG. 13.
Figure 15:
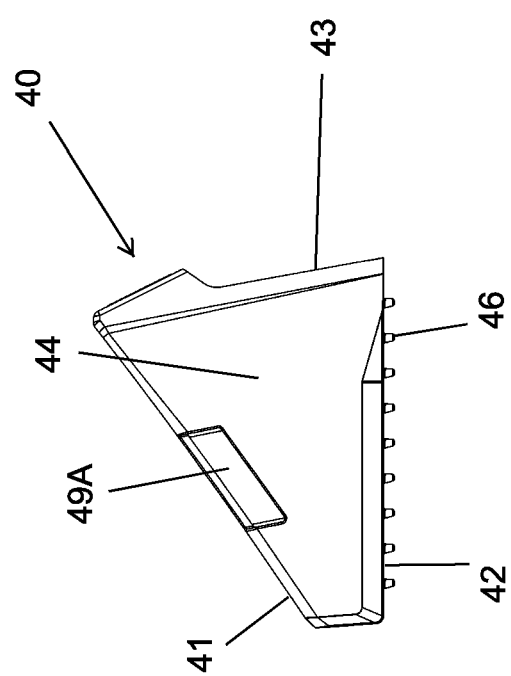
FIG. 15 is a side view of a chock attached to a ramp as shown in FIG. 13.
Figure 16:
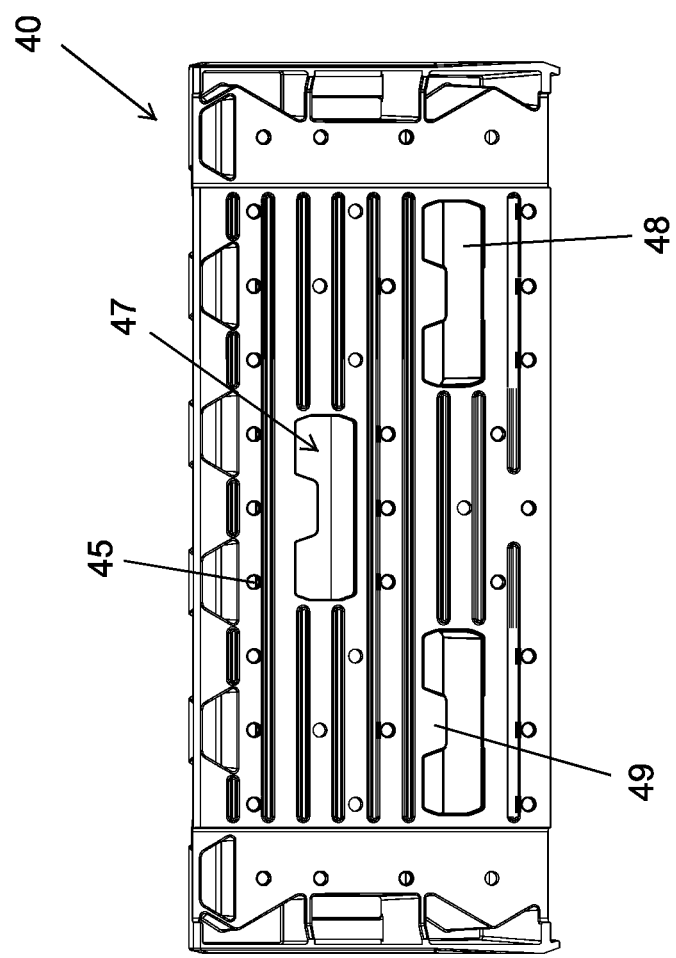
FIG. 16 is a bottom view of a chock attached to a ramp as shown in FIG. 13.

FIGS. 1 to 8 shows a levelling ramp assembly 10 that is primarily used to level dual axle caravans. However, it would be appreciated by persons skilled in the art that the levelling ramp assembly 10 may be used for other types of vehicles and for other purposes.

The levelling ramp assembly 10 includes a ramp 20, chock 40 and two levelling plates 50. The ramp 20, shown in more detail in FIGS. 9 to 12, includes a top ramp face 21, a bottom ramp face 22, an end ramp face 23 and two spaced-apart side ramp faces 24. The two side ramp faces 24 connect the top ramp face 21, the bottom ramp face 22 and the end ramp face 23.

The ramp 20 is constructed from a series of connected hexagon tubes that extend from the bottom ramp face 22 to the top ramp face 21. The bottom ramp face 22 is planer and partially enclosed. A series of drain holes 25 extend through the bottom ramp face 22 and connect to respective hexagonal tubes. Four of the drain holes 25 are also shaped to allow mounting options (not shown).

The top ramp face 21 is largely open, with ends of hexagon tubes being exposed. A series of ramp locking elements 26, in the form of sawtooth teeth, are located on the top ramp face 21. The ramp locking elements 26 are formed in the ends of hexagon tubes and also in a strip that extends along a middle of the top ramp face 21. Ramp locking elements 26 are aligned in straight lines that extend transversely or laterally along the top ramp face 21. The spacing between adjacent ramp locking elements 26 are relatively small which allows for over twenty rows of ramp locking elements 26.

The top ramp face 21 is substantially planar and is inclined at a constant gradient. That is, the top ramp face 21. The top ramp face 21 and the bottom ramp face 22 meet and terminate in a concave edge 27.

The end ramp face 23 is formed from a bench 28 and an inclined face 29. The bench 28 has a front bench wall 30 that extends upwardly from and is perpendicular to the bottom ramp face 22, and a top bench wall 31 that extends rearwardly from the front bench wall 30 to join the inclined face 29. The inclined face 29 is connected to an end of the top bench wall 31 and an end of the top ramp face 21.

Three ramp attachment elements 32 are connected to and extend outwardly from the inclined face 29 of the end ramp face 23. The three ramp attachment elements 32 are spaced apart from each other. Two of the three ramp attachment elements 32 are in transverse alignment and located above the remaining ramp attachment elements 32, which is located lower on the inclined face 29. Each ramp attachment element 32 comprises a shaft 33 having a grove 34 located on the underside of each shaft 33.

The ramp 20 includes four ramp connecting elements 35 that are used to connect two ramps 30 together. The ramp connecting elements 35 are located on the top ramp face 21 adjacent corners. The two ramp connecting elements 35 located adjacent the top corners are male ramp connecting elements 35 in the form of male protrusions 36. The two ramp connecting elements 35 located adjacent the bottom corners are female ramp connecting elements 35 in the form of female projections 37, having a projection hole 38 located within each female projection 36. The projection hole 38 located within each female projection 37 is similarly sized to each male protrusion 36.

The ramp 20 includes four ramp joining elements 39 used to join the two plates 50 to the ramp 20. The ramp joining elements 39 are located on the bottom ramp face 22. The ramp joining elements 39 are in the form of four ramp joining holes. The ramp joining elements 39 also are draining holes and are in alignment with respective hexagonal tubes.

The chock 40, shown in more detail in FIGS. 13 to 16, includes a top chock face 41, a bottom chock face 42, an end chock face 43 and two spaced-apart side chock faces 44. The two side chock faces 44 connect the top chock face 41, the bottom chock face 42 and the end chock face 43.

The chock 40 is constructed from a series of connected hexagon tubes that extend from the bottom chock face 42 to the top chock face 41. The bottom chock face 42 is planar and partially enclosed. A series of drain holes 45 extend through the bottom chock face 42 and connect to respective hexagonal tubes.

The top chock face 41 is largely open, with ends of hexagon tubes being exposed. A series of elongate chock locking elements 46, in the form of sawtooth teeth, are located on the bottom chock face 42. The chock locking elements 46 are formed in the bottom chock face 42. Chock locking elements 46 are aligned in straight lines that extend transversely or laterally along the bottom chock face 42. The spacing between adjacent chock locking elements 46 are relatively small which allows for over eight rows of ramp locking elements 26.

The top chock face 41 is substantially slightly curved and is inclined at a constant gradient. The top chock face 41 and the bottom chock face 42 meet and terminate at a straight edge.

Three chock attachment elements 47 extend inwardly from the bottom chock face 42. The three chock attachment elements 47 are spaced apart from each other. Two of the three chock attachment elements 47 are in transverse alignment and located above the remaining chock attachment element 47, which is located lower on the bottom chock face 42. Each chock attachment element 47 comprises an aperture 48 having a tab 49 located at the top of the aperture 48 adjacent a middle of the aperture 48.

Two tethering elements 49A are located on the chock 40 to enable a tether to be attached to the chock 40. The tethering elements 49A are located on respective side chock faces 44.

The two plates 50, are shown in more detail in FIGS. 17 to 20. Each plate 50 is rectangular in shape and has a top plate face 51 and a bottom plate face 52. The top plate face 51 includes a sunken floor 53 for supporting a caravan stabiliser leg. A recess 54 extends around the perimeter of each plate 50 (and hence also the sunken floor 53) to stop crawling insects such as ants, centipedes, and millipedes from crawling up the caravan stabiliser legs to enter the caravan. Insecticide or water may be placed within the recess 54 to assist with this purpose.

Each of the plates 50 includes two plate joining elements 55. The plate joining elements 55 are in the form of hollow plate joining posts 56 that extend upwardly from the top plate face 51. The hollow 57 extends entirely through the plate joining post 56 and is open at the bottom plate face 52. Accordingly, a series of plates 50 can be attached to each other with a bottom plate joining post 56 nesting within a top plate joining post 57, as shown in FIGS. 18 and 19.

To form the levelling assembly, the chock 40 and two levelling plates are attached to the ramp 20. The chock 40 is attached to the ramp 20 by placing the end ramp face 23 and the bottom chock face 42 so that they face each other so that the ramp attachment elements 32 are aligned with one side of respective chock attachment elements 47. That is, each shaft 33 is aligned within a respective side of the aperture 48. This allows the shafts 33 to enter the respective apertures 48. When the shafts 33 are located within the apertures 48, the bottom chock face 42 and the end ramp face 23 will be located adjacent one another. However, the side chock faces and the ramp side faces will be displaced with respect to each other. The chock 40 is then slid transversely sideways to cause respective tabs 49 to engage with respective slots in the respective shafts 33. This engagement of the tabs 49 and grooves 34 holds the chock 40 to the ramp 20. When the tabs 49 are engaged with the groves, the chock side faces and the ramp side faces are in alignment.

A plate 50 is attached to the ramp 20 by placing the top plate face 51, and the ramp bottom face 22 adjacent each other so that the two plate joining elements 55 are in alignment with the two ramp joining elements 39. The plate 50 is then pushed toward the ramp 20 so that the two plate joining posts engage with the respective two ramp joining holes to join the plate 50 to the ramp 20. This process can be repeated to connect a further plate 50 to the ramp 20 using the next two ramp joining holes and the two plate joining posts on the further plate 50.

It is also possible to connect two ramps 20 together, whether or not the chock 40 or the plates 50 are connected to respective ramps 20. To connected to ramps 20 together, the top ramp face 21 of each of the ramps 20 are located adjacent each other with one ramp 20 being rotated 180 degrees compared to the other ramp 20. The orientation of the two ramps 20 in this manner ensures that the male ramp connecting elements 36 on one top ramp face 21 is in alignment with the female ramp connecting elements 35 on the other ramp 20 and visa-versa. Once the respective male ramp connecting elements 36 are in alignment, the two ramps 20 are pushed together so that two protrusion 36 on one ramp 20 become located in the projection hole 38 on the female projections 37 on the other ramp 20 and visa-versa to connect two ramps 20 together.

Figure 21:
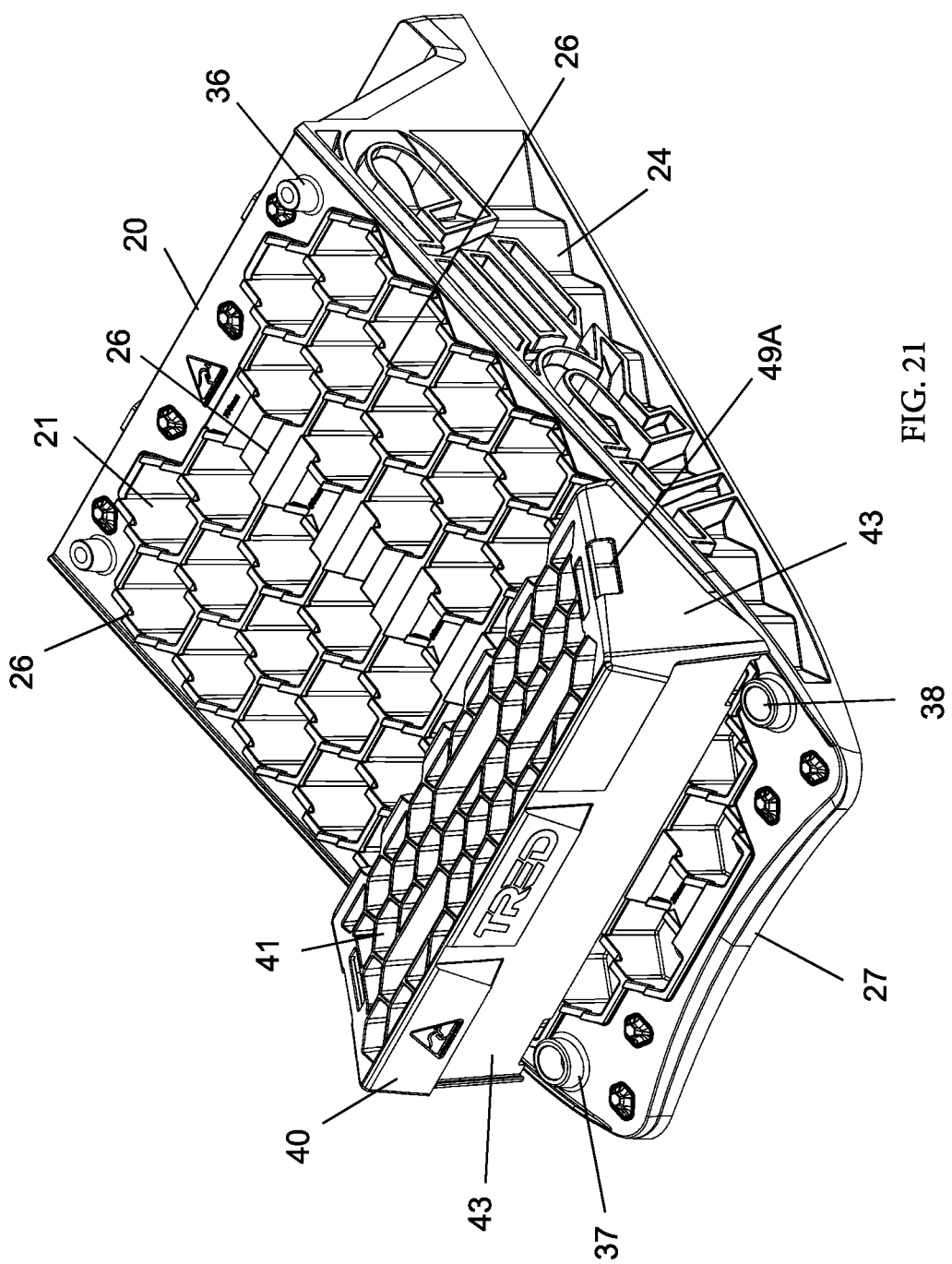
FIG. 21 is a perspective view of a chock locked to a top ramp face of a ramp according to a first embodiment of the invention.
Figure 22:
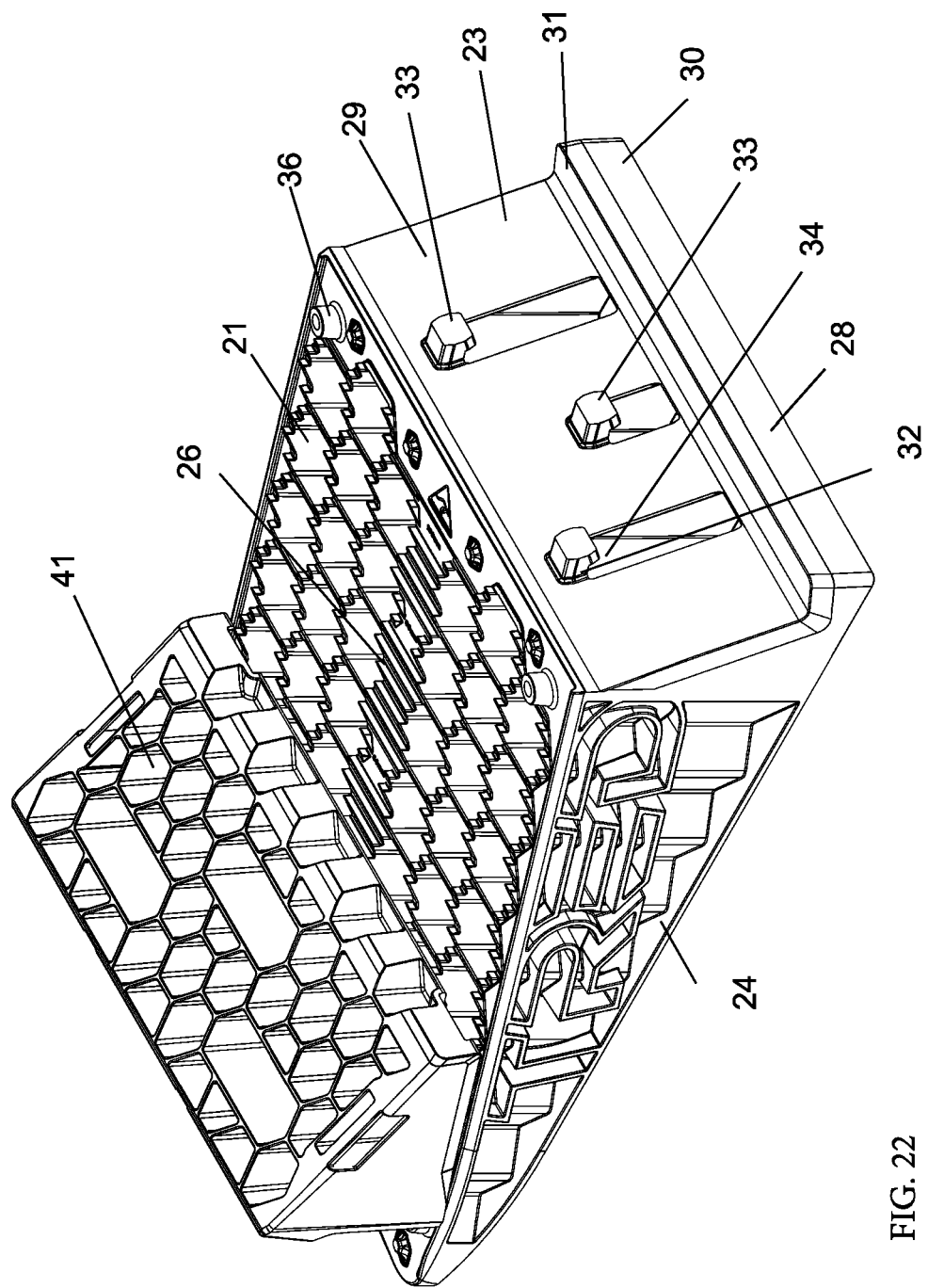
FIG. 22 is a further perspective view of a chock locked to a top ramp face of a ramp as shown in FIG. 5.

In use, the ramp 20 is adjacent both tyres of a dual axle caravan on a low side of the caravan. If the spacing between two wheels is tight, the chock 40 is removed from the ramp 20 by utilising the steps described previously in reverse. The inclined face 29 of the end ramp face 23 is angled to allow the ramp 20 to fit between two caravan wheels. The caravan is then driven up the ramp 20 so that tyres travel up the top face of the ramp 20. When a caravan floor is level, a chock 40 is placed on a respective ramp 20 so that the bottom chock face 42 is located on the top ramp face 21 adjacent to the respective wheel. The chock attachment elements 46 engaged with the ramp locking elements 26 to lock the chock 40 to the ramp 20 as shown in FIGS. 21 and 22. The small increments of between adjacent ramp locking elements 26 and adjacent chock locking elements 46 ensure that the chock 40 can be located on the ramp 20 very close to the tyre. Further, the sawtooth teeth of the inter-engaging ramp locking elements 26 and chock locking elements 46 allows a rachet type movement as the chock 40 is slid along the ramp 40. Thus, when a caravan wheel is chocked, the wheel is held firmly between the top ramp face 21 and the top chock face 41. To remove a chock 40, the caravan is driven up the ramp 20 to take the pressure off the chock 40, and a tether, attached to the tether element 49A, can be used to pull the chock 40 from the ramp 20.

In some instances, the ramp 20 is not of a sufficient height. The plates 50 can be kept on the ramp 20 to increase the height. Similarly, additional plates 50 can be nested together under the ramp 20 to increase the height even further.

The levelling ramp assembly 10 provides an easily storable combined ramp 20, chocks 40 and plates 50. This reduces the chance of losing a chock 40 or a ramp 20 making either component unusable. Similarly, plates 50 can be utilised for stabilising the legs of a caravan as well as to increase the height of the ramp 20.

In this specification, terms such as upward, downward, horizontal and vertical, and their grammatical derivatives, are used to describe the invention in its normal orientation and are not to be construed to limit the invention to any particular orientation.

The reference to any prior art in this specification is not, and should not be taken as, an acknowledgement or any form of suggestion that the prior art forms part of the common general knowledge.

It should be appreciated that various other changes and modifications may be made to the embodiments described without departing from the spirit or scope of the invention.

The invention claimed is:

1. A levelling ramp assembly comprising:
   a ramp for supporting a wheel; the ramp has a top ramp face, a bottom ramp face, an end ramp face and two spaced-apart side ramp faces connecting the top ramp face, the bottom ramp face and the end ramp face, the top ramp face being inclined with respect to the bottom ramp face; one or more ramp attachment elements are located on the end ramp face; and a multiplicity of ramp locking elements are located along a length of the top ramp face;

at least one chock for engaging a wheel whilst on the ramp; the chock having a top chock face, a bottom chock face, an end chock face and two spaced-apart side chock faces connecting the top chock face, the bottom chock face and the end chock face; one or more chock attachment elements are located on the bottom chock face; and one or more chock locking elements are located along a length of the bottom chock face;

wherein in a first configuration the ramp attachment elements and chock attachment elements engage to hold the end ramp face and the bottom chock face together and in a second configuration the ramp locking elements and the chock locking elements engage with each other to lock the bottom chock face to the top ramp face.

2. The levelling ramp of claim 1 wherein the levelling ramp assembly has only a single chock.

3. The levelling ramp of claim 1 wherein the ramp attachment elements slide transversely sideways with respect to the chock attachment elements to attach the ramp to the chock.

4. The levelling ramp of claim 1 wherein the ramp attachment elements slide transversely sideways with respect to the chock attachment to remove the ramp from the chock.

5. The levelling ramp of claim 1 wherein the ramp attachment elements are located at different heights on the end ramp face.

6. The levelling ramp of claim 1 wherein the chock attachment elements are located at different heights on the bottom chock face.

7. The levelling ramp of claim 1 wherein a groove is located within each of the one or more ramp attachment elements and a tab is located within each of the one or more chock attachment elements, the tab and the groove co-operating to hold the ramp attachment elements and chock attachment elements together.

8. The levelling ramp of claim 1 wherein the ramp locking elements are formed along a strip that extends adjacent a middle of the top ramp face.

9. The levelling ramp of claim 1 wherein the ramp includes one or more ramp connecting elements, the ramp connecting elements being used to connect two ramps together.

10. The levelling ramp of claim 9 wherein the levelling ramp assembly includes one or more plates.

11. The levelling ramp of claim 10 wherein the plates are removably attached to the ramp, the ramp including one or more ramp joining elements to join the plates to the ramp.

12. The levelling ramp of claim 11 each plate includes one or more plate joining elements to connect one plate to another plate.

* * * * *